US012799878B2

(12) United States Patent
Smith

(10) Patent No.: US 12,799,878 B2
(45) Date of Patent: Nov. 17, 2026

(54) COMBINED CYCLE POWER GENERATION

(71) Applicant: GE Vernova Infrastructure Technology LLC, Greenville, SC (US)

(72) Inventor: Raub Warfield Smith, Schenectady, NY (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/644,339

(22) Filed: Apr. 24, 2024

(65) Prior Publication Data

US 2024/0360775 A1 Oct. 31, 2024

Related U.S. Application Data

(63) Continuation of application No. PCT/US2023/020447, filed on Apr. 28, 2023.

(51) Int. Cl.
*F01K 23/10* (2006.01)
*F02C 6/18* (2006.01)
(Continued)

(52) U.S. Cl.
CPC .......... *F01K 23/108* (2013.01); *F01K 23/106* (2013.01); *F02C 6/18* (2013.01);
(Continued)

(58) Field of Classification Search
CPC ........ F01K 23/108; F01K 23/106; F01K 7/18; F01K 7/20; F01K 23/10; F02C 6/18; Y02E 20/16
See application file for complete search history.

(56) References Cited

U.S. PATENT DOCUMENTS 4,693,086 A * 9/1987 Hoizumi .................. F01K 7/22
60/663
5,577,377 A * 11/1996 Tomlinson ................ F02C 7/18
60/39.182
(Continued)

FOREIGN PATENT DOCUMENTS

EP 2599971 A2 6/2013
JP H051508 A 1/1993

OTHER PUBLICATIONS

International Report on Patentability for PCT Application No. PCT/US2023/020447 mailed Nov. 6, 2025; 9 pp.
(Continued)

*Primary Examiner* — Phutthiwat Wongwian
*Assistant Examiner* — Rene D Ford
(74) *Attorney, Agent, or Firm* — Armstrong Teasdale LLP

(57) ABSTRACT

A power generation system including a gas turbine is disclosed. The power generation system includes a steam supply system including a high-temperature high pressure superheater and a high-temperature intermediate pressure reheater; a steam turbine assembly including at least one of a non-condensing steam turbine, a high-pressure steam turbine section, an intermediate-pressure steam turbine section; and a low-pressure steam turbine section, and, a control system coupled to the steam supply system and to the steam turbine assembly. The control system configured to selectively control a supply of reheat steam to the non-condensing steam turbine and to the intermediate-pressure steam turbine section; and selectively control a supply of high pressure superheated steam to the non-condensing steam turbine and high-pressure steam turbine section.

16 Claims, 9 Drawing Sheets

(51) Int. Cl.
*F01K 7/18* (2006.01)
*F01K 7/20* (2006.01)

(52) U.S. Cl.
CPC *F01K 7/18* (2013.01); *F01K 7/20* (2013.01); *F01K 23/10* (2013.01); *Y02E 20/16* (2013.01)

(56) References Cited

U.S. PATENT DOCUMENTS

| | | | | | |
|---|---|---|---|---|---|
| 6,101,982 | A * | 8/2000 | Fischer | F01K 23/106 | 122/1 R |
| 6,178,734 | B1 * | 1/2001 | Shibuya | F02C 7/16 | 60/39.182 |
| 6,405,537 | B1 * | 6/2002 | Wada | F01K 23/16 | 60/39.182 |
| 2002/0059792 | A1 * | 5/2002 | Oto | F01K 23/106 | 60/39.182 |
| 2011/0011057 | A1 * | 1/2011 | Bellows | F22B 37/22 | 60/39.5 |
| 2011/0265444 | A1 * | 11/2011 | Bellows | F01K 3/00 | 60/39.182 |
| 2012/0227372 | A1 * | 9/2012 | Li | F01K 23/10 | 29/889.1 |
| 2012/0240549 | A1 * | 9/2012 | Pang | F01K 23/10 | 60/39.182 |
| 2014/0009653 | A1 | 1/2014 | Nishihara | | |
| 2014/0033676 | A1 * | 2/2014 | Pang | F01K 13/00 | 60/39.182 |
| 2015/0218974 | A1 * | 8/2015 | Florey | F01K 7/165 | 415/17 |
| 2015/0308297 | A1 | 10/2015 | Nakamoto et al. | | |
| 2016/0281975 | A1 | 9/2016 | Gasparini et al. | | |
| 2017/0152762 | A1 * | 6/2017 | Murakami | F01K 11/02 | |
| 2023/0108371 | A1 * | 4/2023 | Sharp | F01N 3/2066 | 502/350 |
| 2023/0195985 | A1 | 6/2023 | Cao et al. | | |
| 2024/0360775 | A1 * | 10/2024 | Smith | F01K 23/101 | |

OTHER PUBLICATIONS

Written Opinion and International Search Report for PCT Application No. PCT/US2023020447 mailed Sep. 11, 2023; 10 pp.

* cited by examiner

COMBINED CYCLE POWER GENERATION

CROSS-REFERENCE TO RELATED APPLICATIONS

This application claims priority pursuant to 35 U.S.C. 119(a) to International Application No. PCT/US2023/020447, filed Apr. 28, 2023, which application is incorporated herein by reference in its entirety.

FIELD

The subject matter disclosed herein relates generally to combined cycle power generation systems, and more particularly, relates to combined cycle power generation systems including coordinated system configurations and control strategies that facilitate maximizing load turndown controls.

BACKGROUND

A combined cycle power generation system utilizes a gas turbine and a steam turbine in combination to produce power. The power generation system is arranged such that the gas turbine is thermally connected to the steam turbine through a heat recovery steam generator ("HRSG") that enables feedwater for the steam generation process to be heated by otherwise wasted exhaust gases. In some configurations, the fluid may be steam generated at multiple pressure levels and channeled to any of the high-pressure, intermediate-pressure, and/or low-pressure sections of a steam turbine.

Some combined cycle systems include a steam turbine extractor that provides process steam in support of industrial, carbon capture and sequestration (CCS), or district heating systems. These steam extractions are commonly pressure-controlled to facilitate maintaining the process steam supply pressure across a steam flow or plant load operating range. If the plant load or process steam demand moves outside of the permissible operating range for steam extraction from the turbine, there are commonly fallback provisions to cause steam to be extracted from a high-pressure steam source with subsequent pressure and temperature reduction to satisfy process requirements.

This fallback mode is much less efficient since the process steam is no longer initially expanding to generate power in a steam turbine. Operation is most efficient when process steam is available from the steam extraction after it has already performed work while expanding to the (lower) pressure required for the process. However, the minimum steam turbine load where process steam extraction is technically feasible may be limited, because as load is reduced, the extraction steam temperature gradually increases until the steam turbine components at the extraction point become too hot and exceed thermal limits. This occurs due to decreasing pressure ratio for steam expansion across the turbine between a steam inlet (which reduces in pressure with flow reduction) and steam extraction (which is controlled to fixed pressure by valves, as required for supply to the process steam user).

As such, the ideal location for steam extraction is often downstream of the intermediate pressure (IP) turbine inlet. This leads to a requirement for intermediate-pressure (IP) turbine inlet (reheat) steam temperature turndown control to manage the steam temperature leaving the steam turbine extraction. HRSG's commonly include a water spray attemperator (desuperheater) to reduce the temperature of the high pressure and reheat exit steam by combining the superheated steam with water, such that the steam is cooled as the water evaporates. However, reheat steam temperature control, using conventional steam temperature control means, may be limited. Extending operation with steam extraction active is desired because it is more efficient than shifting the process steam supply to a higher pressure and temperature source since steam from such a source no longer has a chance to do work by expanding through the steam turbine.

Conventional reheat steam temperature control systems with water spray attemperation between reheat sections may be limited by the volume of water that can be safely injected and evaporated within the HRSG. This is also inherently inefficient since high level energy is used to evaporate the spray water within the HRSG. A more efficient approach is to utilize cool steam instead of water to reduce the temperature of the steam entering the reheater. This approach however may also be limited in temperature control authority by how much the exit steam temperature can be reduced. When reheat steam temperature control authority is increased to allow lower steam temperature, the load range available to provide extraction steam to process also increases.

Therefore, there is a need in the art to improve reheat steam temperature turndown control in heat recovery steam generator systems.

SUMMARY

In one aspect, a power generation system including a gas turbine is disclosed. The power generation system includes a steam supply system including a steam supply system including a high-temperature high pressure superheater and a high-temperature intermediate pressure reheater; a steam turbine assembly including at least one of a non-condensing steam turbine, a high-pressure steam turbine section, an intermediate-pressure steam turbine section; and low-pressure steam turbine section; and, a control system coupled to the steam supply system and to the steam turbine assembly, the control system configured to: selectively control a supply of reheat steam to the non-condensing steam turbine and to the intermediate-pressure steam turbine section; and selectively control a supply of high pressure superheated steam to the non-condensing steam turbine and high-pressure steam turbine section.

In another aspect, a control system for use with a power generation system is disclosed. The power generation system including at least a steam turbine assembly and a steam supply system, wherein the steam turbine assembly includes at least one of a non-condensing steam turbine, a high-pressure steam turbine section, an intermediate-pressure steam turbine section, and a low-pressure steam turbine section, the steam supply system includes at least a high temperature high-pressure superheater and a high-temperature intermediate pressure reheater. The control system includes a first control valve to selectively control a supply of one of high pressure superheated steam and reheat steam to the non-condensing steam turbine; a second control valve to selectively control a supply of reheat steam to the intermediate-pressure steam turbine section; and, a main steam control valve to selectively control a supply of high pressure superheated steam to a high-pressure steam turbine section.

In yet another aspect, a method for effectuating load turndown control of a power generation system including a gas turbine assembly is disclosed. The method includes providing a steam supply system including a high-temperature high pressure superheater and a high-temperature intermediate pressure reheater; providing a steam turbine assembly including at least one of a non-condensing steam turbine, a high-pressure steam turbine section, an intermediate-pressure steam turbine section; and a low-pressure steam turbine section, and, coupling a control system to the steam supply system and to the steam turbine assembly, wherein the control system is configured to: selectively control a supply of reheat steam to the non-condensing steam turbine and to the intermediate-pressure steam turbine section; and selectively control a supply of high pressure superheated steam to at least one of the non-condensing steam turbine and the high-pressure steam turbine section.

BRIEF DESCRIPTION

The reference symbols used in the drawings, and their meanings, are listed in summary form in the list of reference symbols. In principle, identical parts are provided with the same reference symbols in the figures.

DETAILED DESCRIPTION

In the following specification and the claims, reference will be made to a number of terms, which shall be defined to have the following meanings.

As used herein, the singular forms "a," "an," and "the" include plural references unless the context clearly dictates otherwise. The terms "comprising," "including," and "having" are intended to be inclusive and mean that there may be additional elements other than the listed elements. The terms "optional" or "optionally" means that the subsequently described event or circumstance may or may not occur, and that the description includes instances where the event occurs and instances where it does not.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms, such as "about," "approximately," and "substantially," is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise.

Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Exemplary embodiments of the present disclosure are directed to various plant design configurations that can be used to improve part load plant efficiency by extending the operable range using controlled steam extraction. The exemplary plant design configurations include one or more of (1) deep reheat steam temperature control, (2) an intermediate pressure (IP) turbine overload valve and (3) a non-condensing steam turbine (NCST) operating in parallel to the main steam turbine. The embodiments described herein use the configurations separately or in combination to achieve the lowest possible plant turndown before a backup source of steam to process is be activated. The present disclosure describes coordination of the configurations to achieve low plant turndown by operation of control valves in various sequences.

Figure 1:
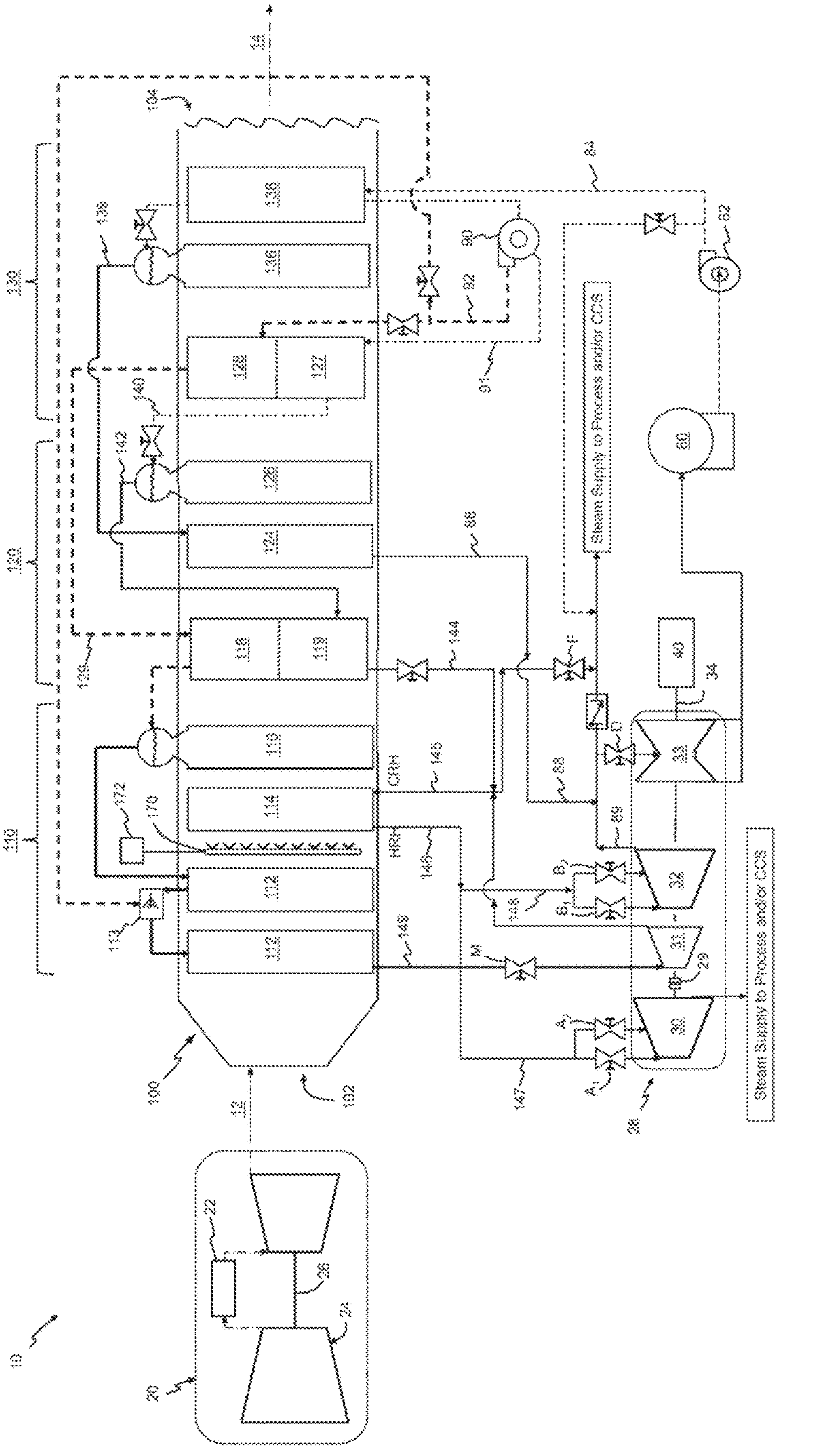
FIG. 1 is a schematic diagram of an exemplary combined cycle power generation system having an HRSG system with combined main and parallel intermediate pressure (IP) non-condensing steam turbine steam supply, in accordance with an embodiment of the present disclosure.

FIG. 1 illustrates an exemplary power generation system 10 including a gas turbine system 20 having a gas combustor 22 and a compressor 24, a main steam turbine 28 and a HRSG 100. The HRSG 100 is an exemplary steam supply system for the main steam turbine 28. It is therefore understood that the illustrated HRSG 100 is merely illustrative of a steam supply system, and other steam supply systems may be included as part of the illustrated power generation system 10. The components of the HRSG 100, in the illustrated embodiment, are a simplified depiction of the HRSG 100 and are not intended to limit what may be included in the HRSG 100. Rather, the illustrated HRSG 100 is merely shown to convey the general operation of HRSG systems. In the exemplary embodiment, the main steam turbine 28 includes a non-condensing steam turbine 30 (referred to as NCST 30) high-pressure turbine section (referred to as HP steam turbine 31), an intermediate-pressure turbine section (referred to as IP steam turbine 32), and one or more low pressure turbine sections (referred to as LP steam turbine 33) with multiple steam admission points at the different pressures. In some embodiments, the NCST 30 also includes a self-synchronizing clutch 29 configured to declutch the NCST 30 when the NCST 30 ceases to produce power in some embodiments as explained in more detail with reference to FIGS. 2-4. In some embodiments, the NCST 30 may alternatively drive its own load or generator instead of being clutched into the main steam turbine generator 28.

The NCST 30 is operable in one or more system operating points. As used herein, the terms "operating point(s)" and "load state(s)" refer generally to operating conditions, and/or states and is not intended to be limiting. Thus, an operating point may refer to an operating state of the NCST 30, such as base load, turndown point, peak fire, and the like. The NCST 30 is operable between a base load state and a minimum load state. The minimum load state is less than the base load state and is defined by the operation point where the NCST 30 ceases to produce steam supply to process and/or CCS. While power generation system load can be further reduced from the minimum load state, further load reduction adversely affects overall system efficiency due to the NCST 30 no longer producing steam supply to process and/or CCS.

The LP steam turbine 33 exhausts into a condenser 80. The main steam turbine 28 drives a generator 40 that produces electrical power via a shaft 34. The main steam turbine 28 generates steam for consumers and end users when operating. In the illustrated embodiment, the gas turbine system 20 drives a load or generator by a shaft 26, however in some embodiments the gas turbine system 20 and the main steam turbine 28 are coupled on a single, common shaft (not shown).

The main steam turbine 28 is associated with a multi-pressure HRSG 100. The HRSG 100 has three different common operating pressures (high, intermediate, and low) wherein steam is generated at the various pressures and temperatures as vapor feed supplied to the corresponding sections of the main steam turbine 28. The HRSG 100 may include, for example, a low-temperature section 130, an intermediate temperature section 120, and a high-temperature section 110 which both generates and superheats high pressure steam as well as reheating intermediate pressure steam.

The HRSG 100 includes an inlet section 102, and an outlet interface 104 that directs exhaust 14 into downstream components of the power generation system including the exhaust stack and/or carbon capture. In some embodiments, the HRSG 100 also includes emissions reduction catalysts (not shown). The high-temperature section 110 includes configurations of reheaters 114 and high-temperature superheaters 112 typically arranged in series. In some embodiments, high-temperature superheaters 112 and/or the high temperature reheaters 114 may be separate or stand-alone components from the HRSG 100.

The high-temperature superheaters 112 generate and output superheated high-pressure steam from the HRSG 100 (or the steam supply system) and the high-temperature reheaters 114 output superheated, intermediate-pressure reheat steam from the HRSG 100 (or the steam supply system). At rated conditions, the high-pressure steam and the reheat steam are characterized as high-temperature steams. The temperature of the reheat steam may be modulated (resulting in a cooler reheat steam) to effectuate temperature control of exit steam from the IP steam turbine 32.

Therefore, steam output from the high-temperature superheaters 112 is referred to as "high pressure high temperature" steam, and steam output from the high-temperature reheaters 114 is referred to as "intermediate pressure high temperature" steam, when exiting the HRSG 100 (or the steam supply system). As the steam flow from the high-temperature superheaters 112 and high-temperature reheaters 114 are expended or otherwise passed through downstream components and processed, they are denoted as high-pressure steam and reheat steam respectively where applicable.

Steam is generated in evaporators 116, 126, 136 and is supplied to the steam turbines 31, 32, 33. The evaporators include a series of fluid tubes (not shown) that extract exhaust heat remaining from upstream sections (superheaters, evaporators, economizers, and reheaters) to generate steam at each pressure level. The fluid tubes of the evaporators are coupled, either directly or indirectly as explained in more detail below, by fluid conduits to economizing sections and to a feed water system that circulates fluid within the heat recovery system. As the exhaust 12 flows through the evaporators and downstream HP economizers, IP and LP steam generation circuits, exhaust gases are further cooled before being exhausted 14 to a stack or to a downstream process such as a steam supply to process and/or CCS. Steam supply to process is from an exhaust of the NCST 30 and/or from pressure-controlled extraction within or at the exhaust of the IP steam turbine 32. In the illustrated embodiment, at least one of conduit 89 (corresponding to the exhaust of the IP steam turbine 32, conduit 88 (corresponding to an outlet of the low-pressure superheater 124) or conduit 145 (corresponding to a cold reheat CRH steam supply to the reheater 114 after mixing with exhaust from the HP steam turbine 31) are directed to steam supply to process and/or CCS.

As used herein, the term "reheat steam temperature control" refers to adjustment of reheat steam exiting the reheater 114. In the illustrated embodiments, a duct burner 170 is immediately upstream from the reheater 114, such that modulating the firing rate, increases or decreases the temperature of the reheat steam exiting the reheater. To effectuate reheat steam temperature control, other means may also be implemented such as, but not limited to, attemperation.

Condensate (in a liquid form) is supplied from a condenser 80 to the low-temperature section 130 of the HRSG 100 via one or more conduits 84 with the aid of a condensate pump 82. The low-temperature section 130 includes an economizer 138 and a low-pressure evaporator 136. Liquid condensate is heated to steam via gases flowing through the HRSG 100, and the steam is directed to a low-pressure superheater 124 via steam conduit 139 prior to it being routed to the LP steam turbine 33 of the main steam turbine 28 via a conduit 88.

The conduit 89 is in fluid communication with a steam exhaust conduit 89 of the IP steam turbine 32, which collectively can be exhausted to steam extraction. A control valve D selectively admits a portion of steam from the conduit 88 and steam exhaust conduit 89 to the LP steam turbine 33. In some embodiments, control valve D can be closed to control upstream steam pressure during steam extraction to steam supply to process and/or CCS as shown in FIG. 1.

From the economizer 138, feedwater is also directed to a feedwater pump 90 from which liquid feedwater is supplied to an intermediate-pressure (IP) economizer 127 by a conduit 91. High pressure discharge water from the feedwater pump 90 is subsequently routed to a high-pressure economizer 128 via a conduit 92. The HP economizer 128 is coupled via a conduit 129 to a HP economizer 118 upstream from the HP economizer 128 and within intermediate temperature section 120.

Feedwater from IP economizer 127 is directed to an intermediate-pressure evaporator 126 positioned upstream from the IP economizer 127 via a conduit 140. The feedwater is evaporated to steam and is routed to the IP superheater 119 via a conduit 142, prior to it being channeled to reheater 114 of the high-temperature section via a conduit 144. Conduit 145 defines a cold reheat (CRH) steam supply to the reheater 114 after mixing with exhaust from the HP steam turbine 31. In addition, a control valve F selectively diverts steam from the conduit 145 to steam extraction when required. Control valve F is a mixture of superheated steam from the IP superheater 119 (via conduit 142) and from the exhaust of IP steam turbine 32 (via conduit 148).

From the reheater 114, steam is further heated resulting in an increase in temperature. An outlet conduit 146 defines a hot reheat conduit (HRH) of the reheater 114. A control valve $A_1$ selectively controls a flow of steam channeled from the reheater 114 into the NCST 30 via conduit 147. In some embodiments, an overload valve $A_2$ is in a parallel configuration with the control valve $A_1$ which together selectively control steam channeled into the NCST 30. In the illustrated embodiment, steam from the hot reheat conduit 146 may also selectively be directed via line 148 into the IP steam turbine 32 of the main steam turbine 28 and the flow of steam entering the IP steam turbine 32 is controlled by a control valve $B_1$ and overload valve $B_2$ in a parallel configuration.

Referring back to the HP economizer 118, water is supplied into a high-pressure evaporator 116 and subsequently fed as steam to a HP superheater 112. In some embodiments, the HRSG 100 includes at least two superheaters 112. In some embodiments, the HRSG 100 also includes an attemperator 113. High pressure high temperature superheated steam is directed from the superheater 112 to the HP steam turbine 31 via steam outlet conduit 149. A main steam control valve M controls steam into the HP steam turbine 31.

In the illustrated embodiments, a duct burner 170 is coupled in series with the reheater 114 and the superheater 112, such that the duct burner 170 is between the reheater 114 and the superheater 112. The duct burner 170 combusts fuel channeled from a fuel source 172. The duct burner 170 facilitates reheat steam temperature control. The duct burner 170 heats the steam exiting the reheater 114 to achieve a target steam temperature. The duct burner 170 can combust fuel at a variable fire rate, and fuel provided to the duct burner 170 can be modulated to selectively control reheat steam temperature, as gas turbine system 20 load is reduced or extracted steam is increased to facilitate maintaining steam turbine extraction temperature within material limits. In some embodiments, other means of reheat steam temperature control may alternately be employed.

During operation of the system, the operating state of NCST 30 and the main steam turbine 28 generally may need to be adjusted to satisfy grid compliance requirements while still operating at the most efficient levels. By way of example, regional grid operators typically prescribe requirements that power generation plants be able to support a grid as demand and grid frequency vary. Supporting the grid during upsets involves increasing or decreasing fuel to gas turbine 20 and hence steam available to NCST 30 and the main steam turbine. It is desirable to operate the system efficiently while in the turn-down state, which may require active control of steam flow, temperature, and pressure of the steam entering and being extracted from each of the HP, IP, and LP steam turbines 31, 32, and 33. During startup and turn-down conditions of the steam systems, while the gas turbine system 20 is in operation or loading or unloading, it may also be desirable to control flow, temperature, and pressure of the fluid flowing to the HP, IP, and LP steam turbines 31, 32, and 33, respectively, as well as NCST 30 to predictably manage equipment life consumption and achieve the most efficient operating mode.

Figure 2:
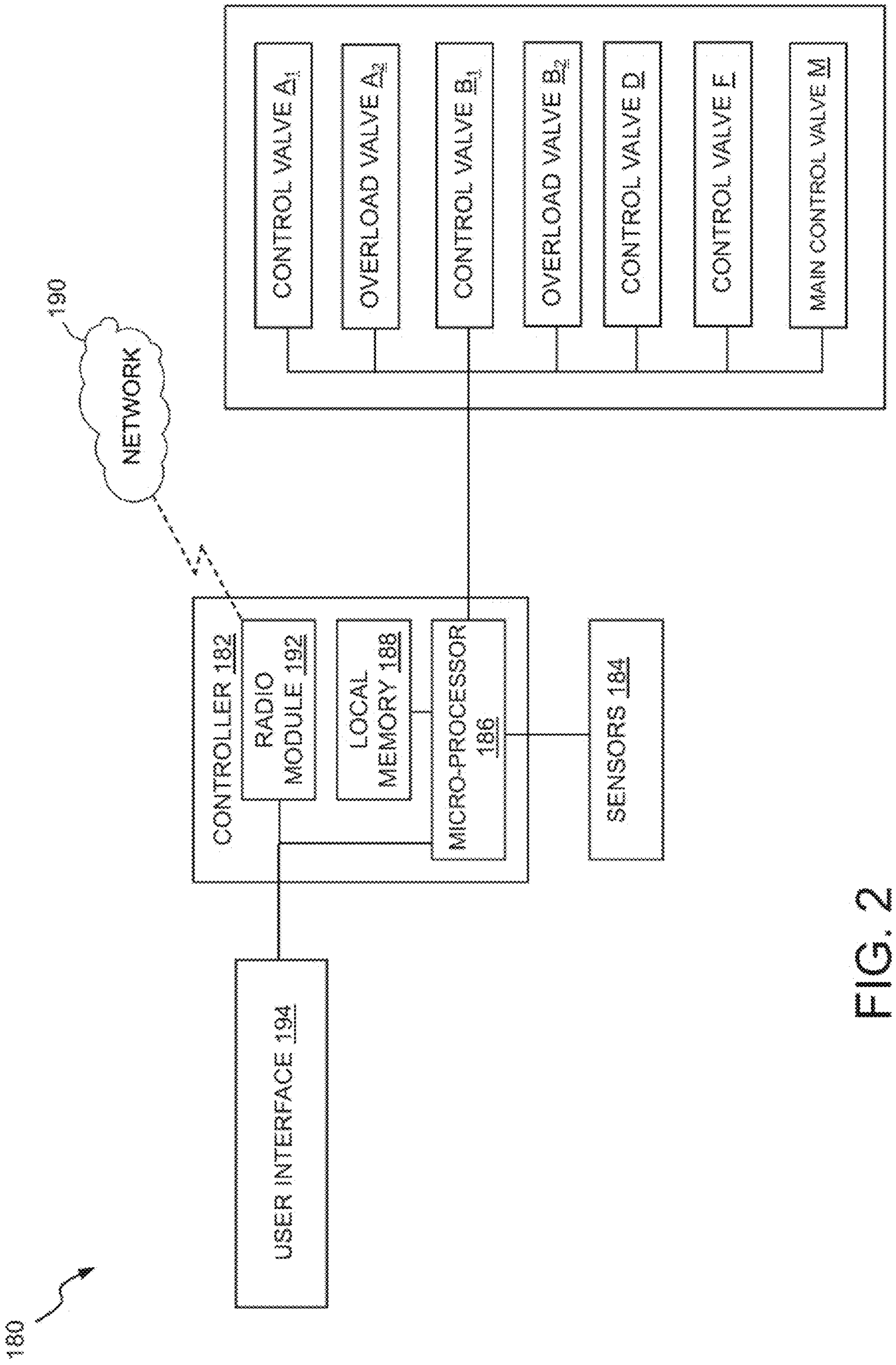
FIG. 2 is a block diagram of a control system to facilitate opening and closing of control valves of the combined cycle power generation system of FIG. 1.

FIG. 2 is a block diagram of a control system 180 for use with the power generation system to facilitate opening and closing of control valves $A_1$, $A_2$, $B_1$, $B_2$, D, F, and M of the combined cycle power generation system of FIG. 1. The illustrated embodiment focuses on the novel aspects presented in this disclosure and thus excludes other valves and control functions common to any steam system control found in the art. The control system 180 includes a system controller 182 communicatively coupled to one or more sensors 184 and to the control valves $A_1$, $A_2$, $B_1$, $B_2$, D, F, and M. The system controller 182 includes a microprocessor 186 and a local memory 188, and the microprocessor 186 communicates with the one or more sensors 184 and to the control valves $A_1$, $A_2$, $B_1$, $B_2$, D, F, and M using, for example, a wired Modbus connection or a wireless connection. The system controller 182 is further in communication with a network 190. For example, in some embodiments, system controller 182 further includes a radio module 192 communicatively coupled to microprocessor 186, through which microprocessor 186 can communicate with network 190. In some embodiments, radio module 192 is configured to communicate with other elements of the network using a specific communications protocol. The control system 180 further includes a user interface 194 for receiving inputs from a user.

The one or more sensors 184 include system performance sensors, pressure sensors, temperature sensors and flow sensors. The control valves $A_1$, $A_2$, $B_1$, $B_2$, D, F, and M use electrical, pneumatic, or hydraulic power to actuate opening and closing of the valves $A_1$, $A_2$, $B_1$, $B_2$, D, F, and M between an open state, a closed state and a partially open or partially closed state, and the valves $A_1$, $A_2$, $B_1$, $B_2$, D, F, and M operate in response to a control signal generated by the system controller 182. Microprocessor 186 is configured to read instructions stored in local memory 188 and generate the control signal for valves $A_1$, $A_2$, $B_1$, $B_2$, D, F, and M based on the instructions and sensor data received from sensors 184 and the user interface 194. Such instructions include data that defines settings under which microprocessor 186 controls the operation of valves $A_1$, $A_2$, $B_1$, $B_2$, D, F, and M. For example, valve operation may be controlled by the microprocessor by specifying a particular control signal output for a given sensor data or user input.

In some embodiments, the system controller 182 is connected to the gas turbine system 20, the steam turbine system 28 and to the HRSG 100 to facilitate operation of the power generation system 10.

Figure 3:
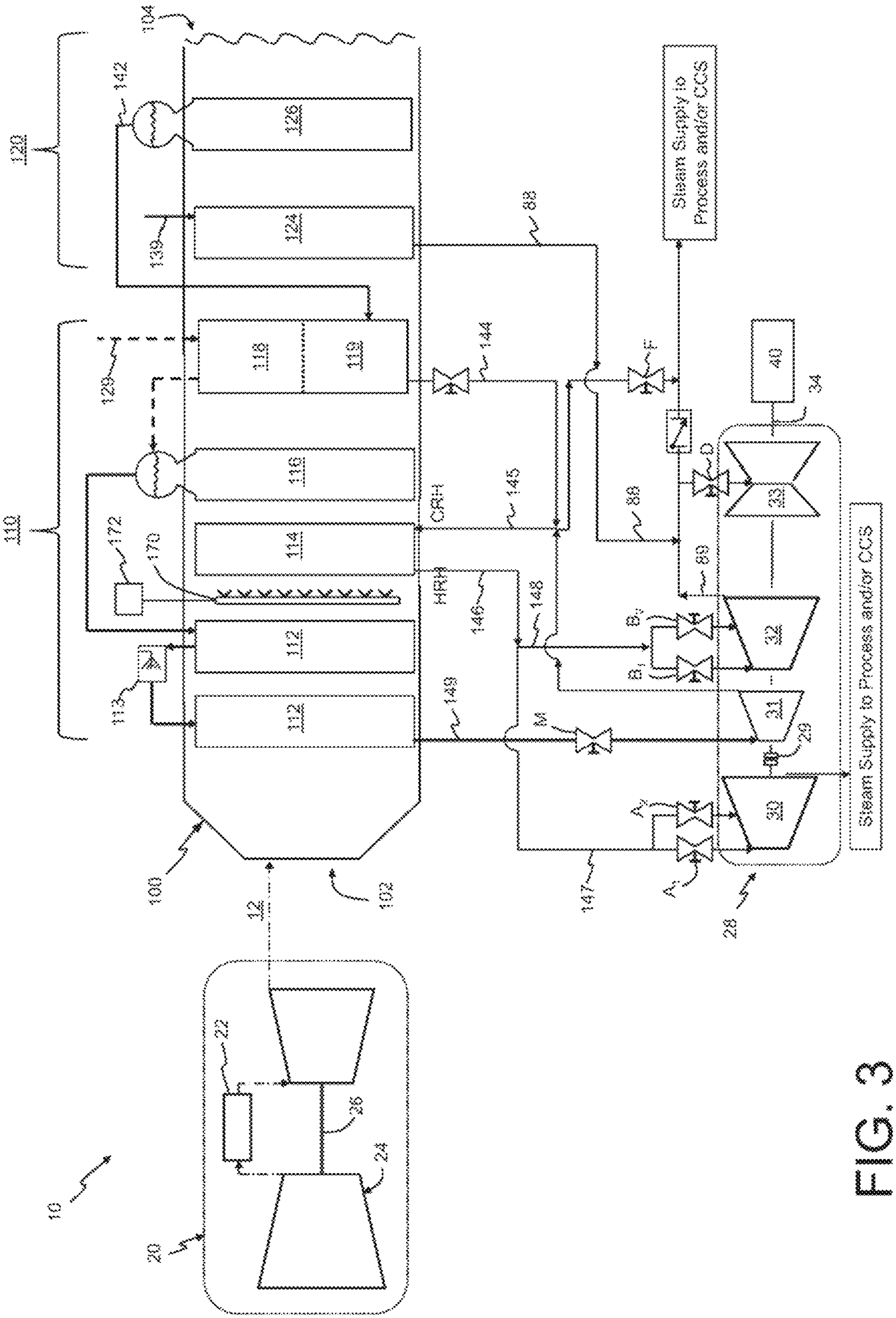
FIG. 3 is a schematic diagram of the power generation system of FIG. 1, including an exemplary HRSG system with combined main and parallel IP non-condensing steam turbine steam supply.

FIG. 3 illustrates a detailed view of the steam turbine system 28 and HRSG 100 with a combined NCST 30 and a parallel IP steam turbine 32 steam supply to process. Hot reheat steam from the reheater 114 is supplied, from conduit 146 to the NCST 30 and to the IP steam turbine 32 via conduits 147 and 148 respectively, defining a parallel configuration of the NCST 30 and the IP steam turbine 32. Conduit 147 includes the control valve $A_1$ and optionally overload valve $A_2$, coupled in parallel, which control steam flow into the NCST 30, and conduit 148 includes the control valve $B_1$ and optionally overload valve $B_2$, coupled in parallel, such that each controls steam entering the IP steam turbine 32 from the reheater 114. The control valve $A_1$ and control valve $B_1$ enable the power generation system to have two turbines available (the NCST 30 and the IP steam turbine 32) to provide process steam so their operation can be coordinated.

Control valve D controls steam flow to the inlet of the LP steam turbine 33 and steam pressure in conduits 88 and 89, selectively diverting a portion of steam from these conduits to process steam extraction. Control valve F selectively diverts steam from the CRH conduit 145 to process steam extraction if valve D has reached it throttling limit and is thus no longer able to maintain steam pressure in conduits 88 and 89 at the target value and NCST 30 is non-operational. Control valve F is a mixture of superheated steam from the IP superheater 119 (via conduit 144) and from the exhaust of HP steam turbine 31. Main steam control valve M controls steam into the HP steam turbine 31. The control valves $A_1$, $A_2$, $B_1$, $B_2$, D, F, and M define a control valve system that includes one or more processors or controllers to control opening and closing of the valves $A_1$, $A_2$, $B_1$, $B_2$, D, F, and M in various sequences and configurations as described herein. Each control valve $A_1$, $A_2$, $B_1$, $B_2$, D, F, and M has a fully open state, a partially open state, and a fully closed state.

As used herein, the terms "fully open" and "fully open state" denote a control valve that is operated at an upper flow limit as required by the system and is substantially fully open. In embodiments where oversized control valves are used, a "fully open" and "fully open state" of the oversized control valve denotes a control valve operated at an upper flow limit as required by the system, however the control valve may be further opened. Similarly, as used herein, the terms "fully closed" and fully closed state" denote a control valve that is operated at a lower flow limit as required by the system and is substantially fully closed. Therefore, the terms "fully open" and "fully closed" do not require that a control valve be exercised to its physical control limit, and that the control valve may be operated at the either end of its control limit.

The sequences described herein are in accordance with one or more operating load states of the power generation system 10, described for the case where both overload valves $A_2$ and $B_2$ are present. Operating load is reduced from a base operating load to one or more of a first load state, second load state etc. to a minimum load state. Stated differently, each plant process change or opening and closing of the valves $A_1$, $A_2$, $B_1$, $B_2$, D, F, and M are in response to a reduction of operating load of the power generation system 10 as gas turbine 20 load is reduced. The parallel configuration of the NCST 30 and the IP steam turbine 32, in combination with deep reheat steam temperature control facilitates maximum plant load turn-down with expanded steam supply to process. Installation of overload valves $A_2$ and $B_2$ further extends the load turndown capability of the IP steam turbine 32 and the NCST 30 respectively.

In an exemplary sequencing operation utilizing the configuration of FIG. 3, in a base load state of the NCST 30, control valves M, $A_1$, $B_1$, and D, and overload valves $A_2$ and $B_2$ are each in the fully open state with steam supply to process flowing normally as shown in FIG. 3.

As load on the power generation system 10 is reduced to a first load state from a base operating load, control valve D at least partially closes as necessary to facilitate maintaining process extraction steam pressure of the IP steam turbine 32, while control valves $A_1$ and $B_1$ remain open as overload valve $B_2$ and/or overload valve $A_2$ at least partially close to facilitate maintaining a pressure ratio of steam expanded through at least one of the IP steam turbine 32 and the NCST steam turbine 30. Extraction steam pressure at the exhaust from NCST 30 is maintained by valves in the downstream process steam line (not shown).

As load on the power generation system is reduced to a second load state, and when overload valve $B_2$ and/or overload valve $A_2$ is in the fully closed state, control valve $A_1$ at least partially closes to facilitate maintaining pressure ratio of steam expanded through the IP steam turbine 32 at rated condition. In some embodiments, the NCST 30 is rated for high exhaust temperatures such that the NCST 30 can operate with a low stage pressure ratio without a need to reduce hot reheat steam temperature.

As load on the power generation system is reduced to a third load state, and minimum steam flow to the NCST 30 is reached, control valve $A_1$ fully closes. The third load state is defined by the IP steam turbine 32 operating at its rated inlet pressure as valve $A_1$ closes. Because the IP steam turbine 32 is operating at its rated inlet pressure when valve $A_1$ closes, overload valve $B_2$ at least partially reopens to facilitate protecting the IP steam turbine 32 from excessive inlet pressure. Furthermore, the NCST 30 ceases to produce power and clutch 29 declutches as NCST 30 and coasts down to turning gear speed.

Alternatively, in some embodiments the closing of control valve $A_1$ may be deferred by continued plant unloading, with control valve $A_1$ held to its minimum opening, thus allowing inlet steam pressure of the IP steam turbine 32 to decrease below its rated inlet value. In this sequencing, closure of control valve $A_1$ to take the NCST 30 out of service is timed to increase steam flow to the IP steam turbine 32 such that inlet pressure in conduit 148 returns to rated pressure and overload valve $B_2$ remains closed.

As load on the power generation system is reduced to a minimum load state, overload valve $B_2$ is first closed to maintain IP steam turbine pressure ratio. After overload valve $B_2$ is fully closed, further gas turbine unloading reduces HRH steam flow in conduits 146 and 148 and hence IP steam turbine pressure ratio. The HRH steam temperature is reduced to manage IP steam turbine 32 exhaust temperature. The lower load boundary for the fourth load state is reached when control valve D reaches a maximum throttling limit or when steam extraction temperature to process in conduit 89 or upstream in the IP steam turbine 32 reaches its temperature limit despite fully depressed HRH steam temperature.

The reheat steam temperature control is adjusted by duct burner 170 modulation or other reheat steam temperature control means. If the temperature of the IP steam turbine 32 exhaust has reached an operable rated design limit, then steam supply to process will shift to cold reheat supply via control valve F, or similarly provisioned higher pressure steam source. In this operating configuration, in some embodiments, control valve D opens to eliminate crossover throttling, thus relieving IP steam turbine 32 exhaust temperature. A shift to cold reheat steam supply or the like may also be dictated by other constraints such as IP steam turbine 32 inlet temperature reduction as for cyclic life expenditure considerations.

Figure 4:
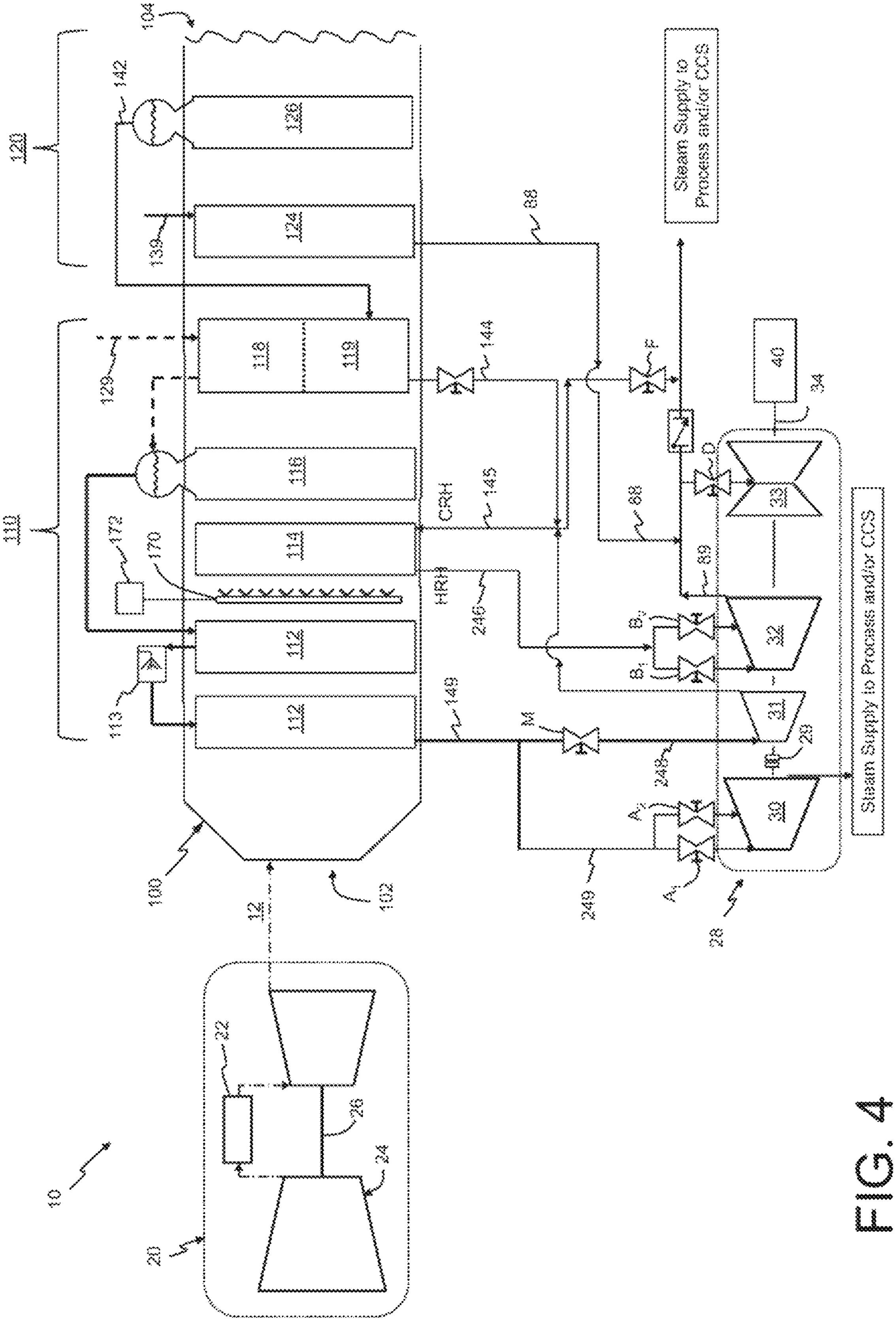
FIG. 4 is a schematic diagram of the power generation system of FIG. 1 including an exemplary HRSG system with combined main and parallel HP non-condensing steam turbine steam supply; and, FIGS. 5A through 5E illustrate a method for effectuating load turndown control of power generation system including a gas turbine assembly.
Figure 5A:
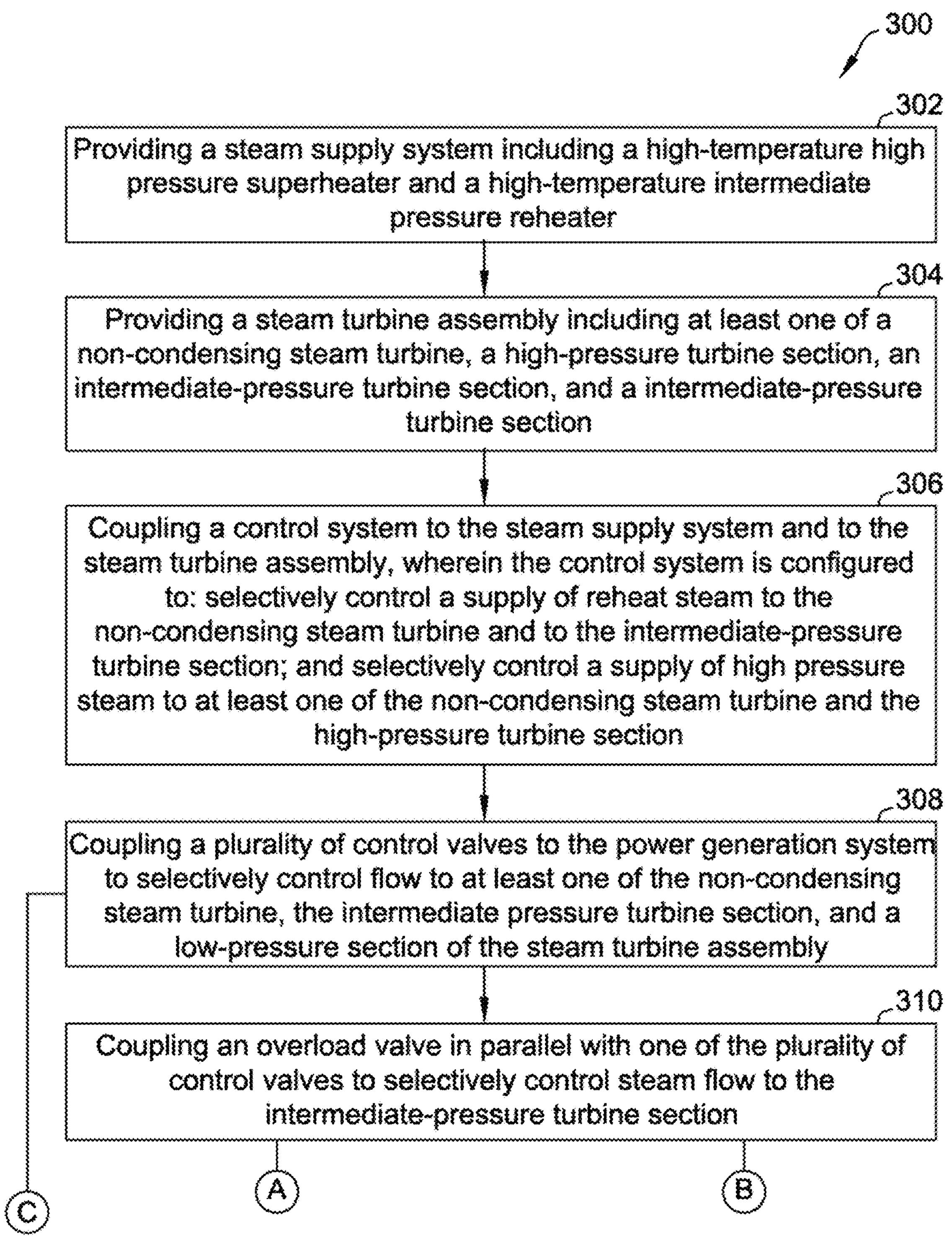
Figure 5B:
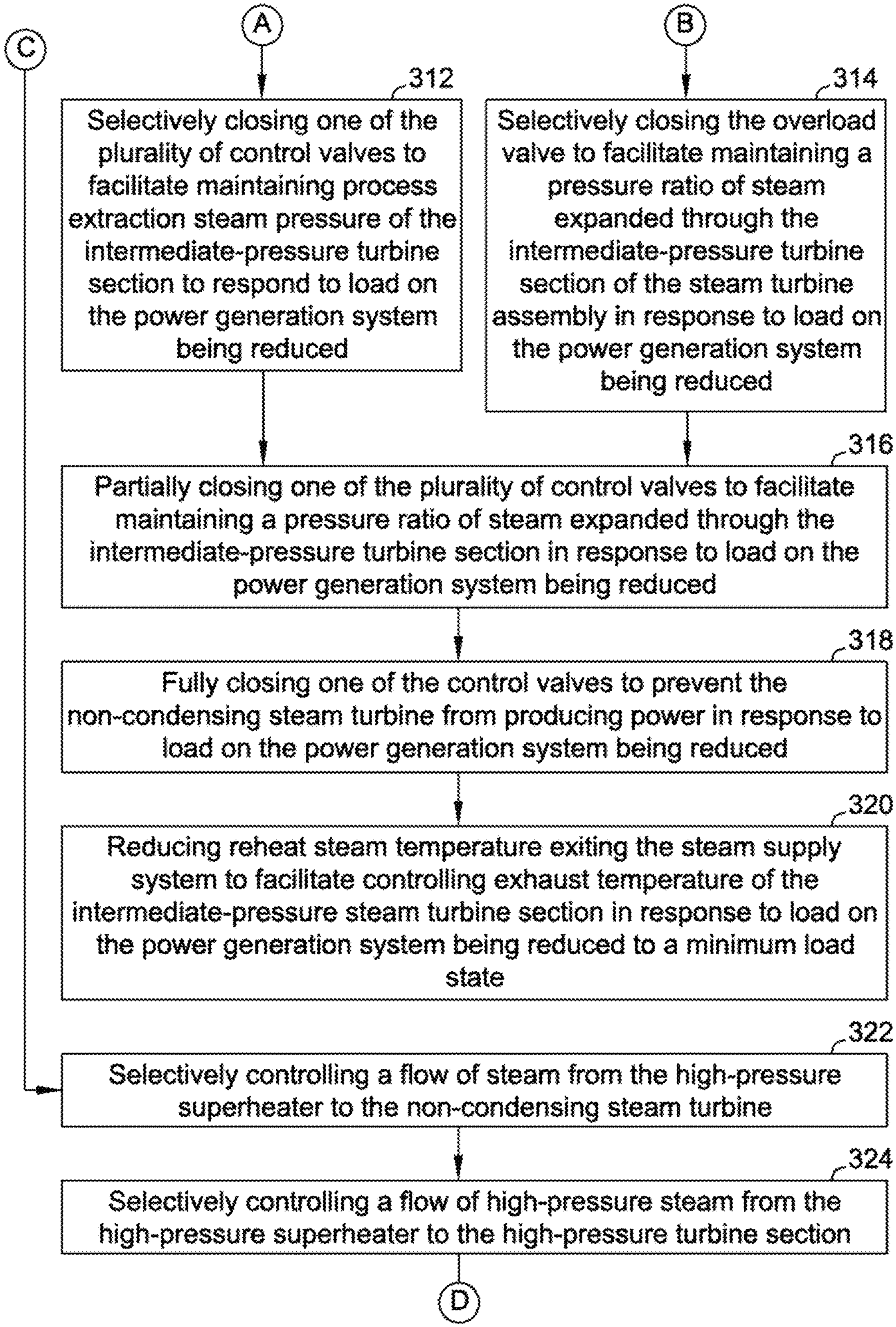
Figure 5C:
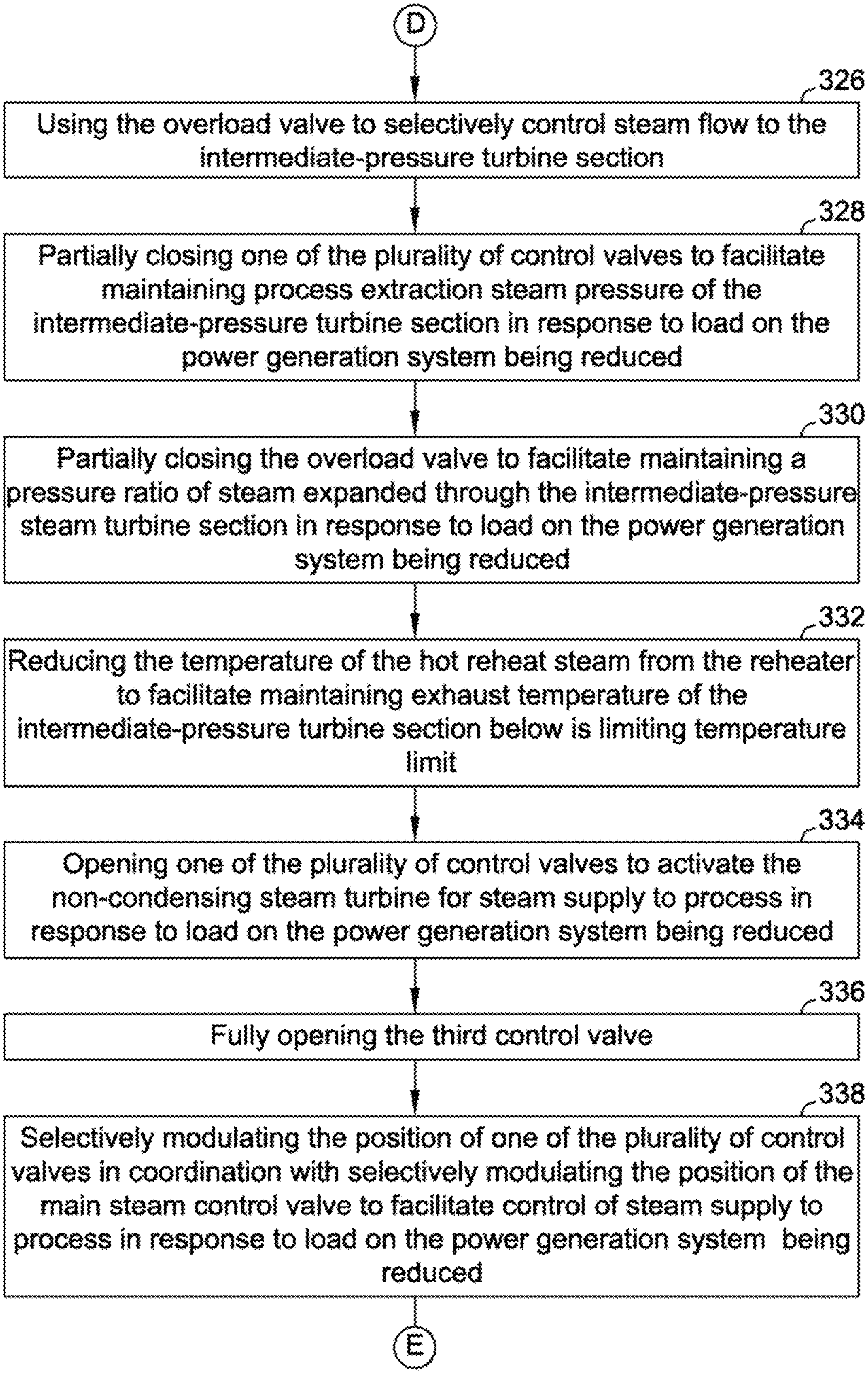
Figure 5D:
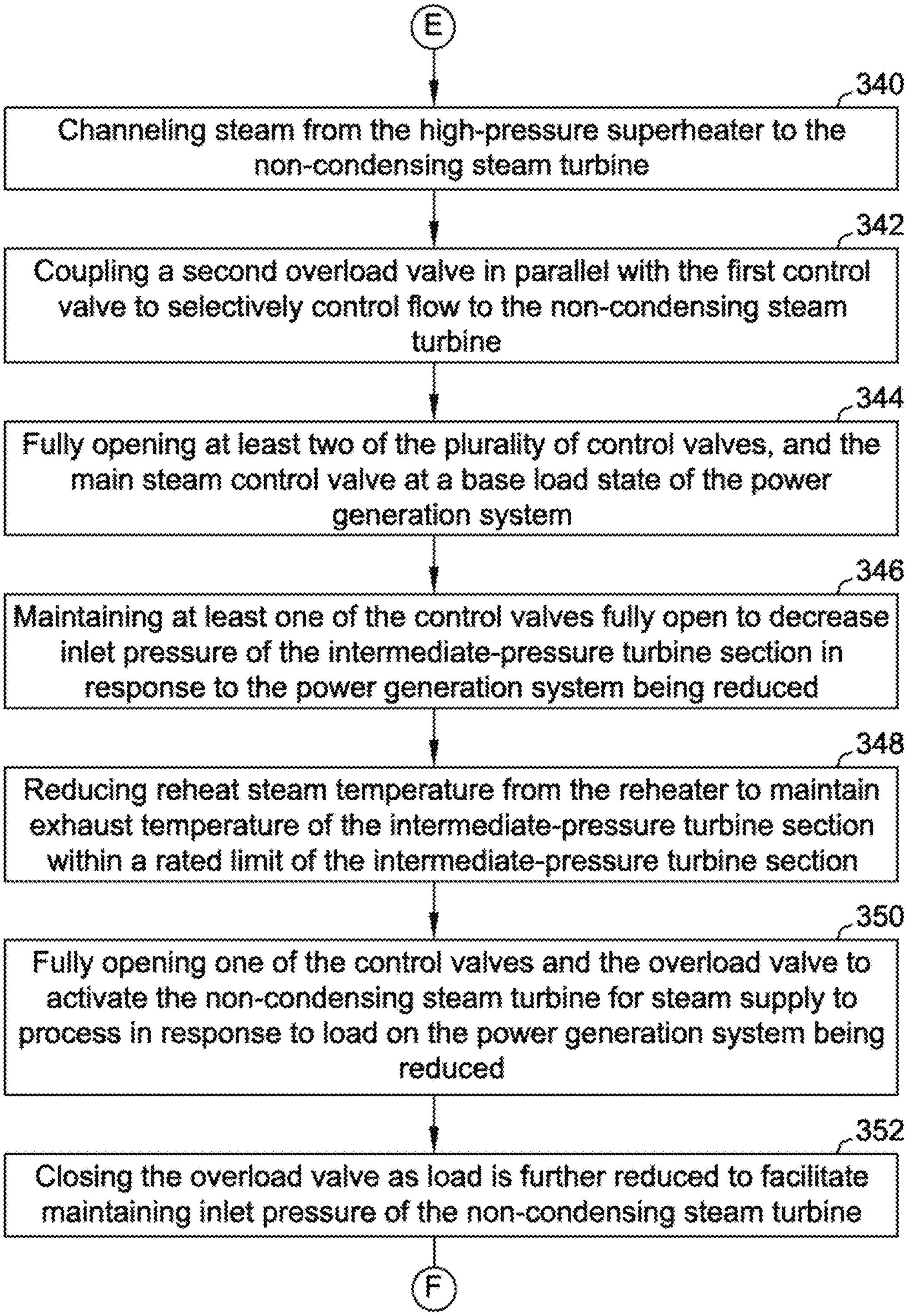
Figure 5E:
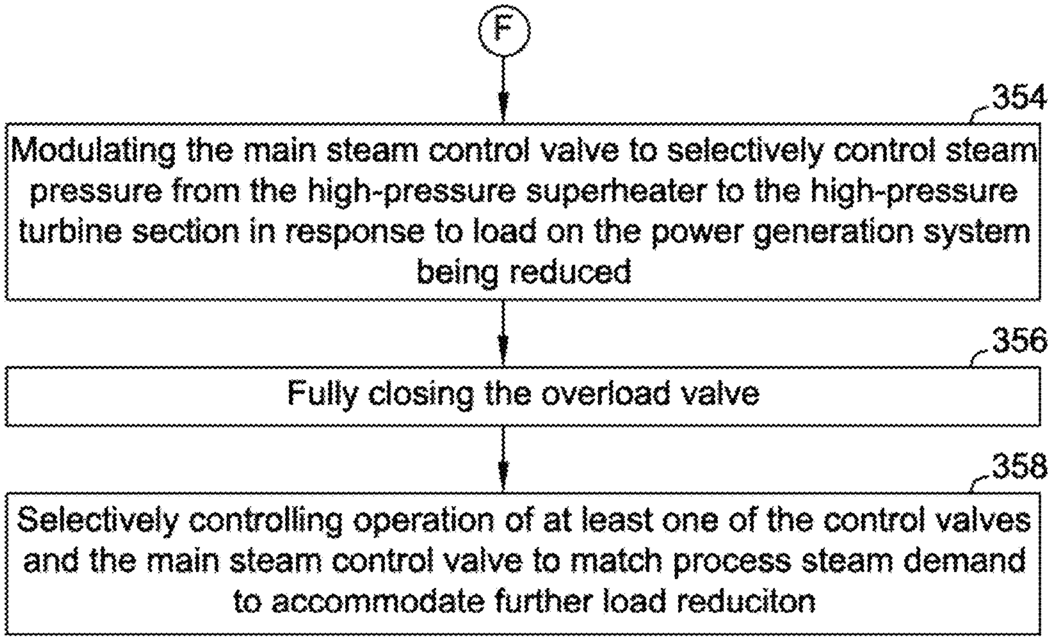

FIG. 4 illustrates an alternative embodiment of the NCST 30 and HRSG 100 with both NCST 30 and HP steam turbine 31 receiving HP steam from conduit 149. Hot reheat steam from the reheater 114 is supplied, from conduit 246 to the IP steam turbine 32. High pressure high temperature steam from the superheater 112 is supplied, from conduit 149 via conduit 248, to the HP steam turbine 31 and via conduit 249 to the NCST 30. Conduit 249 includes the control valve $A_1$ and optionally an overload valve $A_2$, coupled in a parallel configuration with control valve $A_1$, to control steam flow to the NCST 30. Conduit 246 includes the control valve $B_1$ and optionally overload valve $B_2$, coupled in parallel, to control the steam supply to the IP steam turbine 32. Control valve D controls steam flow to the inlet of the LP steam turbine 33 and steam pressure in conduits 88 and 89, selectively diverting a portion of steam from these conduits to process steam extraction. Control valve F selectively diverts steam from the CRH conduit 145 to process steam extraction if NCST 30 is non-operational and valve D has reached it throttling limit and is thus no longer able to maintain steam pressure in conduits 88 and 89 at the target value. Control valve F is a mixture of superheated steam from the IP superheater 119 (via conduit 144) and from the exhaust of HP steam turbine 31. Main steam control valve M controls steam into the HP steam turbine 31. Each control valve $A_1$, $A_2$, $B_1$, $B_2$, D, F, and M has a fully open state, a partially open state, and a fully closed state.

The operation of the NCST 30 and the IP steam turbine 32 in combination with deep reheat steam temperature control enables for maximum plant load turndown with expanded steam supply to process. Furthermore, high pressure steam supply to the NCST 30 facilitates deeper turndown of the NCST 30 before it needs to be shut down or declutched, in contrast to the configuration of FIG. 3 using HRH steam supply from the reheater 114. The exemplary configuration of FIG. 4 includes a first sequencing operation and a second sequencing operation each of which correspond to embodiments for enabling maximum plant load turndown with expanded steam supply to process.

In the first sequencing operation, in a base load state of the NCST 30, control valves $A_1$, $B_1$, and D and overload valves $A_2$ and $B_2$ are each in the fully open state with steam supply to process and/or CCS flowing normally from both the IP turbine exhaust and NCST exhaust as shown in FIG. 4.

As load on the power generation system is reduced to a first load state, control valve D at least partially closes as necessary to facilitate maintaining process extraction steam pressure of the IP steam turbine 32, while control valves $A_1$ and $B_1$ remain open as overload valves $A_2$ and $B_2$ at least partially close to facilitate maintaining a pressure ratio of steam expanded through at least one of the NCST 30 and the IP steam turbine 32. Extraction steam pressure at the exhaust from NCST 30 is maintained by valves in the downstream process steam line (not shown).

As load on the power generation system is reduced to a second load state, and overload valve $B_2$ is in the fully closed state, control valve $B_1$ remains fully open as reheat steam temperature is controlled to maintain IP steam turbine 32 exhaust 89 below its limiting temperature limit. Overload valve $A_2$ also goes fully closed and flow split between NCST 30 and HP steam turbine 31 is managed by coordination of valves $A_1$ and M, such that process steam supply from the exhaust of NCST 30 in combination with process steam from the IP steam turbine 32 meets the demanded flow.

In some embodiments, the NCST 30 is rated for high exhaust temperatures such that the NCST 30 can operate with low section pressure ratio without a need to drop inlet steam temperature of the NCST 30. After overload valve $B_2$ is fully closed, further gas turbine unloading reduces HRH steam flow in conduits 146 and 148 and hence IP steam turbine pressure ratio. The HRH steam temperature is reduced to manage IP steam turbine 32 exhaust temperature. The lower load boundary for the second load state is reached when control valve D reaches a maximum throttling limit or when steam extraction temperature to process in conduit 89 reaches its temperature limit despite fully depressed HRH steam temperature.

As load on the power generation system is reduced to a third load state, process steam extraction from the IP turbine extraction and/or exhaust is stopped. In this operating configuration, in some embodiments, control valve D opens to eliminate crossover throttling, thus relieving IP steam turbine 32 exhaust temperature. Process steam supply continues from the NCST 30 exhaust until minimum steam flow to the NCST 30 is reached. Control valve $A_1$ fully closes, causing a modest bump in steam supply pressure to the HP steam turbine 31. Valve M may be full open or partially closed when this load state is entered, depending on power plant load and process steam demand. The NCST 30 ceases to produce power and clutch 29 declutches as NCST 30 coasts down to turning gear speed. As the NCST 30 stops supplying process steam, control valve F opens, receiving a mixture of superheated steam from the IP superheater 119 (via conduit 144) and from the exhaust of HP steam turbine 31 or similarly provisioned higher pressure steam source. Control valves $B_1$ and D, are in their fully open state throughout this process.

In the second sequencing operation of FIG. 4, in a base load state of the main steam turbine 28 control valves $B_1$ and D and overload valve $B_2$ are each in the fully open state with steam supply to process flowing normally mixing IP ST exhaust stream 89 and LP steam stream 88 as shown in FIG. 4. Control valve $A_1$ and overload valve $A_2$ supplying NCST 30 are fully closed and the NCST 30 is declutched and on turning gear.

As load on the power generation system is reduced to a first load state, control valve D at least partially closes as to facilitate maintaining process extraction steam pressure of the IP steam turbine 32, while control valve $B_1$ remains open as overload valve $B_2$ at least partially closes to facilitate maintaining a pressure ratio of steam expanded through the IP steam turbine 32.

As load on the power generation system is reduced to a second load state (defined by the IP steam turbine inlet pressure beginning to drop) IP steam turbine exhaust temperature tends to increase. With control valve $B_1$ remaining fully open, hot reheat steam temperature is reduced to facilitate maintaining the IP steam turbine exhaust temperature within its rated limit. The reheat steam temperature control is altered by modulating the duct burner 170 modulation but may be by other prior art means.

As load on the power generation system is reduced to a third load state (defined by a maximum IP steam turbine turndown as determined by any of several limits such as reheat steam temperature control, minimum IP steam turbine inlet temperature, maximum control valve D turndown, and the like) control valve $A_1$ and overload valve $A_2$ are opened to activate NCST 30 for steam supply to process and/or CCS. This process steam extraction mode transfer ends process extraction from the IP steam turbine-controlled extraction via conduit 89. The NCST 30 is sized and rated for this partial load plant condition to supply full process flow. After the NCST 30 is serving this supply need, control valve D can revert to fully open, sliding pressure operation. Reheat steam temperature may also be increased since IP steam turbine expansion ratio increases, thereby reducing component and steam temperature at the now inactive extraction point. HP steam flow split between NCST 30 and HP steam turbine 31 is managed by coordination of control valve $A_1$, overload valve $A_2$ and main steam control valve M, such that process steam supply from the exhaust of NCST 30 meets the demanded flow. Overload valve $A_2$ closes before control valve $A_1$.

As load on the power generation system is reduced to a minimum load state, control valve $A_1$ and main steam control valve M modulate to control steam flow to process. NCST 30 exhaust temperature increases as process flow decreases. The NCST 30 is rated for high exhaust temperature such that the NCST 30 can operate with low section pressure ratio without a need to adjust the steam supply temperature to NCST 30 via conduit 249. When the maximum NCST 30 flow turndown is reached, control valve $A_1$ closes. The NCST 30 ceases to produce power and declutches and coasts down to turning gear speed. The steam supply to process subsequently shifts to cold reheat supply, or other configured backup steam source, via control valve F.

FIGS. 5A through 5E illustrate a method 300 for effectuating load turndown control of a power generation system (such as the systems illustrated in FIGS. 1-3) including a gas turbine assembly.

The method 300 includes providing 302 a steam supply system including a high-temperature high pressure superheater and a high-temperature intermediate pressure reheater, providing 304 a steam turbine assembly including at least one of a non-condensing steam turbine, a high-pressure turbine section, an intermediate-pressure turbine section, and a low-pressure turbine section, and, coupling 306 a control system to the steam supply system and to the steam turbine assembly. The control system is configured to selectively control a supply of reheat steam to the non-condensing steam turbine and to the intermediate-pressure turbine section, and selectively control a supply of high pressure superheated steam to at least one of the non-condensing steam turbine and the high-pressure turbine section.

The method 300 further includes coupling 308 a plurality of control valves to the power generation system to selectively control flow to at least one of the non-condensing steam turbine, the intermediate-pressure turbine section, and a low-pressure section of the steam turbine assembly. The method 300 further includes coupling 310 an overload valve in parallel with one of the plurality of control valves to selectively control flow to the intermediate-pressure turbine section.

The method 300 further includes selectively closing 312 one of the plurality of control valves to facilitate maintaining process extraction steam pressure of the intermediate-pressure turbine section in response to load on the power generation system being reduced, and selectively closing 314 the overload valve to facilitate maintaining a pressure ratio of steam expanded through the intermediate-pressure turbine section of the steam turbine assembly in response to load on the power generation system being reduced.

The method 300 further includes partially closing 316 one of the plurality of control valves to facilitate maintaining a pressure ratio of steam expanded through the intermediate-pressure turbine section in response to load on the power generation system being reduced. The method 300 further includes fully closing 318 one of the control valves to prevent the non-condensing steam turbine from producing power in response to load on the power generation system being reduced. The method 300 further includes reducing 320 reheat steam temperature exiting the steam supply system to facilitate controlling exhaust temperature of the intermediate-pressure steam turbine section in response to load on the power generation system being reduced to a minimum load state.

In some embodiments, the method 300 further includes selectively controlling 322 a flow of steam from the high-pressure superheater to the non-condensing steam turbine, selectively controlling 324 a flow of steam from the high-pressure superheater to the high-pressure turbine section and using 326 the overload valve to selectively control steam flow to the intermediate-pressure turbine section.

In some embodiments, the method 300 further includes partially closing 328 one of the plurality of control valves to facilitate maintaining process extraction steam pressure of the intermediate-pressure turbine section in response to load on the power generation system being reduced and partially closing 330 the overload valve to facilitate maintaining a pressure ratio of steam expanded through the intermediate-pressure steam turbine section in response to load on the power generation system being reduced. In some embodiments, the method 300 further includes reducing 332 the temperature of the hot reheat steam from the reheater to facilitate maintaining exhaust temperature of the intermediate-pressure turbine section below its limiting temperature limit.

In some embodiments, the method 300 further includes opening 334 one of the plurality of control valves to activate the non-condensing steam turbine for steam supply to process in response to load on the power generation system being reduced and fully opening 336 the third control valve. In some embodiments, the method 300 further includes selectively modulating 338 the position of one of the plurality of control valves in coordination with selectively modulating the position of the main steam control valve to facilitate control of steam supply to process in response to load on the power generation system being reduced.

In some embodiments, the method 300 further includes channeling 340 high-pressure steam from the high-pressure superheater to the non-condensing steam turbine, coupling 342 a second overload valve in parallel with the first control valve to selectively control flow to the non-condensing steam turbine and fully opening 344 at least two of the plurality of control valves, and the main steam control valve at a base load state of the power generation system.

In some embodiments, the method 300 further includes maintaining 346 at least one of the control valves fully open to decrease inlet pressure of the intermediate-pressure turbine section in response to load on the power generation system being reduced and, reducing 348 reheat steam temperature from the reheater to maintain exhaust temperature of the intermediate-pressure turbine section within a rated limit of the intermediate-pressure turbine section. In some embodiments, the method 300 further includes fully opening 350 one of the control valves and the overload valve to activate the non-condensing steam turbine for steam supply to process in response to load on the power generation system being reduced and closing 352 the overload valve as load is further reduced to facilitate maintaining inlet pressure of the non-condensing steam turbine.

In some embodiments, the method 300 further includes modulating of 354 the main steam control valve to selectively control-steam pressure from the high-pressure superheater to the high-pressure turbine section in response to load on the power generation system being reduced, fully closing 356 the overload valve; and, selectively controlling 358 operation of at least one of the control valves and the main steam control valve to match process steam demand to accommodate further load reduction.

The systems described herein facilitate improved part-load plant efficiency by extending the operable range with controlled steam extraction active. In particular, the plant design configurations include one or more of (1) deep reheat steam temperature control, (2) an intermediate pressure (IP) turbine and/or NCST overload valve and (3) a non-condensing steam turbine (NCST) receiving either HP or HRH steam in parallel with the HP steam turbine or IP steam turbine. The embodiments described herein utilize the configurations separately or in combination to achieve the lowest possible plant turndown before a backup source of steam to process is be activated.

The methods, systems, and configurations disclosed herein are not limited to the specific embodiments described herein, but rather, steps of the methods, elements of the systems, and/or elements of the compositions may be utilized independently and separately from other steps and/or elements described herein. For example, the methods, systems, and compositions are not limited to practice with only a rotary machine as described herein. Rather, the methods, systems, and compositions may be implemented and utilized in connection with many other applications.

Although specific features of various embodiments may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described in terms of various specific embodiments, those skilled in the art will recognize that the invention can be practiced with modification within the spirit and scope of the claims.

Further aspects of the invention are provided by the subject matter of the following clauses:

A power generation system including a gas turbine, the power generation system including: a steam supply system including a high-temperature high pressure superheater and a high-temperature intermediate pressure reheater; a steam turbine assembly including at least one of a non-condensing steam turbine, a high-pressure steam turbine section, an intermediate-pressure steam turbine section; and low-pressure steam turbine section; and, a control system coupled to the steam supply system and to the steam turbine assembly, the control system configured to: selectively control a supply of reheat steam to the non-condensing steam turbine and to the intermediate-pressure steam turbine section; and selectively control a supply of high pressure superheated steam to the non-condensing steam turbine and high-pressure steam turbine section.

The power generation system of the preceding clause, wherein the control system comprises a first control valve to selectively control flow to the non-condensing steam turbine, a second control valve to selectively control flow to the intermediate-pressure steam turbine section, and a third control valve to selectively control a supply of steam to the low-pressure steam turbine section from the steam supply system.

The power generation system of any preceding clause, wherein the control system further comprises an overload valve coupled in parallel with the second control valve to selectively control flow to the intermediate-pressure steam turbine section, wherein the first, second and third control valves and the overload valve are each in a fully open state at a base load of the power generation system.

The power generation system of any preceding clause, wherein as load on the power generation system is reduced to a first load state, the third control valve at least partially closes to facilitate maintaining process extraction steam pressure of the intermediate-pressure steam turbine section and the overload valve at least partially closes to facilitate maintaining a pressure ratio of steam expanded through the intermediate-pressure steam turbine section.

The power generation system of any preceding clause, wherein as load on the power generation system is reduced to a second load state and the overload valve is fully closed, the first control valve at least partially closes to facilitate maintaining a pressure ratio of steam expanded through the intermediate-pressure steam turbine section.

The power generation system of any preceding clause, wherein as load is reduced to a third load state and a minimum steam flow rate to the non-condensing steam turbine is sustained, the first control valve fully closes such that the non-condensing steam turbine ceases to produce power.

The power generation system of any preceding clause, wherein as load on the power generation system is reduced to a minimum load state, the overload valve is initially closed, and reheat steam temperature exiting the steam supply system is reduced to facilitate controlling exhaust temperature of the intermediate-pressure steam turbine section.

The power generation system of any preceding clause, wherein the non-condensing steam turbine receives steam from the high pressure superheater via the first control valve, and the high-pressure steam turbine section receives steam from the high pressure superheater via a main steam control valve, wherein the control system further comprises an overload valve coupled in parallel with the second control valve to selectively control flow to the intermediate-pressure steam turbine section, wherein the second control valve, third control valve, main steam control valve and the overload valve coupled in parallel with the second control valve are each in a fully open state at a base load of the power generation system.

The power generation system of any preceding clause, wherein as load on the power generation system is reduced to a first load state, the third control valve at least partially closes to facilitate maintaining process extraction steam pressure of the intermediate-pressure steam turbine section and the overload valve at least partially closes to facilitate maintaining a pressure ratio of steam expanded through the intermediate-pressure steam turbine section.

The power generation system of any preceding clause, wherein as load on the power generation system is reduced to a second load state and the overload valve closes, hot reheat steam temperature of the reheater is reduced to facilitate maintaining exhaust temperature of the intermediate-pressure steam turbine section below its limiting temperature limit.

The power generation system of any preceding clause, wherein as load on the power generation system is reduced to a third load state, the first control valve is opened to activate the non-condensing steam turbine for steam supply to process The power generation system of any preceding clause, wherein as load on the power generation system is reduced to minimum load state, and wherein the position of the first control valve is modulated in coordination with the main steam control valve to facilitate control of steam supply to process.

The power generation system of any preceding clause, wherein the non-condensing steam turbine receives steam exhausted from the high-pressure superheater, wherein the control system further comprises an overload valve in parallel with the first control valve to selectively control flow to the non-condensing steam turbine, wherein the main steam control valve are fully open, and the first control valve and the overload valve are fully closed at a base load state of the power generation system.

The power generation system of any preceding clause, wherein as load on the power generation system is reduced to a first load state of the power generation system, the third control valve at least partially closes to facilitate maintaining process extraction steam pressure of the intermediate-pressure steam turbine section.

The power generation system of any preceding clause, wherein as load on the power generation system is reduced to a second load state, the second control valve is maintained fully open such that inlet pressure of the intermediate-pressure steam turbine section decreases and reheat steam temperature from the reheater is reduced to maintain exhaust temperature of the intermediate-pressure steam turbine section within a rated limit of the intermediate-pressure steam turbine section.

The power generation system of any preceding clause, wherein as load on the power generation system is reduced to a third load state, the first control valve and the overload valve are opened to activate the non-condensing steam turbine for steam supply to process, wherein the overload valve is closed as load is further reduced to facilitate maintaining inlet pressure of the non-condensing steam turbine.

The power generation system of any preceding clause, wherein the main steam control valve selectively controls steam pressure from the high-pressure superheater to the high-pressure steam turbine section, wherein as load on the power generation system is reduced to a minimum load state and the overload valve is fully closed, further load reduction is accommodated by selectively controlling operation of first control valve and main steam control valve to match process steam demand.

The power generation system of any preceding clause, wherein closing of first control valve reduces an expansion pressure ratio in the non-condensing steam turbine.

A control system for use with a power generation system including at least a steam turbine assembly and a steam supply system, wherein the steam turbine assembly includes at least one of a non-condensing steam turbine, a high-pressure steam turbine section, an intermediate-pressure steam turbine section, and a low-pressure steam turbine section, the steam supply system includes at least a high temperature high-pressure superheater and a high-temperature intermediate pressure reheater, the control system including: a first control valve to selectively control a supply of one of high pressure superheated steam and reheat steam to the non-condensing steam turbine; a second control valve to selectively control a supply of reheat steam to the intermediate-pressure steam turbine section; and, a main steam control valve to selectively control a supply of high pressure superheated steam to a high-pressure steam turbine section.

The control system of the preceding clause further including: a third control valve to selectively control a supply of steam to the low-pressure steam turbine section the steam supply system and from the intermediate pressure steam turbine section; an overload valve coupled in parallel with the second control valve to selectively control the supply of reheat steam to the intermediate-pressure steam turbine section; and, an overload valve coupled in parallel with the first control valve to selectively control one of a supply of high pressure superheated steam to the non-condensing steam turbine and a supply of reheat steam to the non-condensing steam turbine.

A method for effectuating load turndown control of a power generation system including a gas turbine assembly, the method including: providing a steam supply system including a high-temperature high pressure superheater and a high-temperature intermediate pressure reheater; providing a steam turbine assembly including at least one of a non-condensing steam turbine, a high-pressure steam turbine section, an intermediate-pressure steam turbine section; and a low-pressure steam turbine section; and, coupling a control system to the steam supply system and to the steam turbine assembly, wherein the control system is configured to: selectively control a supply of reheat steam to the non-condensing steam turbine and to the intermediate-pressure steam turbine section; and selectively control a supply of high pressure superheated steam to at least one of the non-condensing steam turbine and the high-pressure steam turbine section.

The method of any preceding clause further including coupling a plurality of control valves to the power generation system to selectively control flow to at least one of the non-condensing steam turbine, the intermediate-pressure steam turbine section, and a low-pressure section.

The method of any preceding clause further including coupling an overload valve in parallel with one of the plurality of control valves to selectively control flow to the intermediate-pressure steam turbine section.

The method of any preceding clause further including: selectively closing one of the plurality of control valves to facilitate maintaining process extraction steam pressure of the intermediate-pressure steam turbine section in response to load on the power generation system being reduced; and, selectively closing the overload valve to facilitate maintaining a pressure ratio of steam expanded through the intermediate-pressure steam turbine section in response to load on the power generation system being reduced.

The method of any preceding clause further including partially closing one of the plurality of control valves to facilitate maintaining a pressure ratio of steam expanded through the intermediate-pressure steam turbine section in response to load on the power generation system being reduced.

The method of any preceding clause further including fully closing one of the control valves to prevent the non-condensing steam turbine from producing power in response to load on the power generation system being reduced.

The method of any preceding clause further including reducing reheat steam temperature exiting the steam supply system to facilitate controlling exhaust temperature of the intermediate-pressure steam turbine section in response to load on the power generation system being reduced to a minimum load state.

The method of any preceding clause further including: selectively controlling a flow of steam from the high pressure superheater to the non-condensing steam turbine; selectively controlling a flow of steam from the high pressure superheater to the high-pressure steam turbine section; using the overload valve to selectively control flow to the intermediate-pressure steam turbine section.

The method of any preceding clause further including: partially closing one of the plurality of control valves to facilitate maintaining process extraction steam pressure of the intermediate-pressure steam turbine section in response to load on the power generation system being reduced; and, partially closing the overload valve to facilitate maintaining a pressure ratio of steam expanded through the intermediate-pressure steam turbine section in response to load on the power generation system being reduced.

The method of any preceding clause further including reducing the temperature of the hot reheat steam temperature of the reheater to facilitate maintaining exhaust temperature of the intermediate-pressure steam turbine section below its limiting temperature limit.

The method of any preceding clause further including: opening one of the plurality of control valves to activate the non-condensing steam turbine for steam supply to process in response to load on the power generation system being reduced.

The method of any preceding clause further including selectively modulating the position of one of the plurality of control valves in coordination with selectively modulating the position of the main steam control valve to facilitate control of steam supply to process in response to load on the power generation system being reduced.

The method of any preceding clause further including channeling steam from the high-pressure superheater to the non-condensing steam turbine; coupling a second overload valve in parallel with the first control valve to selectively control flow to the non-condensing steam turbine; and fully opening at least two of the plurality of control valves, and the main steam control valve at a base load state of the power generation system.

The method of any preceding clause further including: maintaining at least one of the control valves fully open to decrease inlet pressure of the intermediate-pressure steam turbine section in response to load on the power generation system being reduced; and, reducing reheat steam temperature from the reheater to maintain exhaust temperature of the intermediate-pressure steam turbine section within a rated limit of the intermediate-pressure steam turbine section.

The method of any preceding clause further including: fully opening one of the control valves and the overload valve to activate the non-condensing steam turbine for steam supply to process in response to load on the power generation system being reduced; and, closing the overload valve as load is further reduced to facilitate maintaining inlet pressure of the non-condensing steam turbine.

The method of any preceding clause further including: coupling the main steam control valve to selectively control steam from the high-pressure superheater to the high-pressure steam turbine section in response to load on the power generation system being reduced; fully closing the overload valve; and, selectively controlling operation of at least one of the control valves and the main steam control valve to match process steam demand to accommodate further load reduction.

What is claimed is:

1. A power generation system including a gas turbine, the power generation system comprising:

a steam supply system including a high-temperature high pressure superheater and a high-temperature intermediate pressure reheater;

a steam turbine assembly including a non-condensing steam turbine, a high-pressure steam turbine section, and an intermediate-pressure steam turbine section; and a control system including a controller communicatively coupled to a plurality of valves included in the steam supply system and to the steam turbine assembly, the control system configured to:

selectively control a supply of reheat steam to the non-condensing steam turbine and to the intermediate-pressure steam turbine section, via at least one of the plurality of valves; or selectively control a supply of high pressure superheated steam to the non-condensing steam turbine and high-pressure steam turbine section, via at least one of the plurality of valves;

wherein the steam turbine assembly further includes a low-pressure steam turbine section, and wherein the plurality of valves comprises a first control valve to selectively control flow to the non-condensing steam turbine, a second control valve to selectively control flow to the intermediate-pressure steam turbine section, and a third control valve to selectively control a supply of steam to the low-pressure steam turbine section from the steam supply system; and wherein the plurality of valves further comprises an overload valve coupled in parallel with the second control valve to selectively control flow to the intermediate-pressure steam turbine section, wherein the first, second and third control valves and the overload valve are each in a fully open state at a base load of the power generation system.

2. The power generation system of claim 1, wherein as the load on the power generation system is reduced to a first load state, the third control valve at least partially closes to facilitate maintaining process extraction steam pressure of the intermediate-pressure steam turbine section and the overload valve at least partially closes to facilitate maintaining a pressure ratio of steam expanded through the intermediate-pressure steam turbine section.

3. The power generation system of claim 2, wherein as the load on the power generation system is reduced to a second load state and the overload valve is fully closed, the first control valve at least partially closes to facilitate maintaining the pressure ratio of steam expanded through the intermediate-pressure steam turbine section.

4. The power generation system of claim 3, wherein as the load on the power generation system is reduced to a third load state and a minimum steam flow rate to the non-condensing steam turbine is sustained, the first control valve fully closes such that the non-condensing steam turbine ceases to produce power.

5. The power generation system of claim 4, wherein as the load on the power generation system is reduced to a minimum load state, the overload valve is initially closed, and a reheat steam temperature exiting the steam supply system is reduced to facilitate controlling an exhaust temperature of the intermediate-pressure steam turbine section.

6. A power generation system including a gas turbine, the power generation system comprising:

a steam supply system including a high-temperature high pressure superheater and a high-temperature intermediate pressure reheater;

a steam turbine assembly including a non-condensing steam turbine, a high-pressure steam turbine section, and an intermediate-pressure steam turbine section; and a control system including a controller communicatively coupled to a plurality of valves included in the steam supply system and to the steam turbine assembly, the control system configured to:

selectively control a supply of reheat steam to the non-condensing steam turbine and to the intermediate-pressure steam turbine section, via at least one of the plurality of valves; or selectively control a supply of high pressure superheated steam to the non-condensing steam turbine and high-pressure steam turbine section, via at least one of the plurality of valves;

wherein the steam turbine assembly further includes a low-pressure steam turbine section, and wherein the plurality of valves comprises a first control valve to selectively control flow to the non-condensing steam turbine, a second control valve to selectively control flow to the intermediate-pressure steam turbine section, and a third control valve to selectively control a supply of steam to the low-pressure steam turbine section from the steam supply system; and wherein the non-condensing steam turbine receives the supply of high pressure superheated steam from the high pressure superheater via the first control valve, and the high-pressure steam turbine section receives the supply of high pressure superheated steam from the high pressure superheater via a main steam control valve, wherein the plurality of valves further comprises an overload valve coupled in parallel with the second control valve to selectively control flow to the intermediate-pressure steam turbine section, wherein the second control valve, third control valve, main steam control valve and the overload valve coupled in parallel with the second control valve are each in a fully open state at a base load of the power generation system.

7. The power generation system of claim 6, wherein as the load on the power generation system is reduced to a first load state, the third control valve at least partially closes to facilitate maintaining process extraction steam pressure of the intermediate-pressure steam turbine section and the overload valve at least partially closes to facilitate maintaining a pressure ratio of steam expanded through the intermediate-pressure steam turbine section.

8. The power generation system of claim 7, wherein as the load on the power generation system is reduced to a second load state and the overload valve closes, a hot reheat steam temperature of the reheater is reduced to facilitate maintaining an exhaust temperature of the intermediate-pressure steam turbine section below a hot reheat steam temperature limiting temperature limit.

9. The power generation system of claim 8, wherein as the load on the power generation system is reduced to a third load state, the first control valve is opened to activate the non-condensing steam turbine.

10. The power generation system of claim 9, wherein as the load on the power generation system is reduced to a minimum load state, a position of the first control valve is modulated in coordination with the main steam control valve.

11. The power generation system of claim 10, wherein the non-condensing steam turbine receives the supply of high pressure superheated steam exhausted from the high pressure superheater, wherein the control system further comprises the overload valve in parallel with the first control valve to selectively control flow to the non-condensing steam turbine, wherein the main steam control valve is fully open and the first control valve and the overload valve are fully closed at a base load state of the power generation system.

12. The power generation system of claim 11, wherein as the load on the power generation system is reduced to the first load state of the power generation system, the third control valve at least partially closes to facilitate maintaining process extraction steam pressure of the intermediate-pressure steam turbine section.

13. The power generation system of claim 12, wherein as the load on the power generation system is reduced to the second load state, the second control valve is maintained fully open such that inlet pressure of the intermediate-pressure steam turbine section decreases and reheat steam temperature from the reheater is reduced to maintain the exhaust temperature of the intermediate-pressure steam turbine section within a rated limit of the intermediate-pressure steam turbine section.

14. The power generation system of claim 13, wherein as the load on the power generation system is reduced to the third load state, the first control valve and the overload valve are opened to activate the non-condensing steam turbine for steam supply to process, wherein the overload valve is closed as load is further reduced to facilitate maintaining inlet pressure of the non-condensing steam turbine.

15. The power generation system of claim 14, wherein the main steam control valve selectively controls steam pressure from the high pressure superheater to the high-pressure steam turbine section, wherein as the load on the power generation system is reduced to the minimum load state and the overload valve is fully closed, further load reduction is accommodated by selectively controlling operation of the first control valve and main steam control valve to match process steam demand.

16. The power generation system of claim 15, wherein closing of the first control valve reduces an expansion pressure ratio in the non-condensing steam turbine.

* * * * *